Aug. 19, 1941.   P. M. LUND   2,253,130
HYDRAULICALLY CONTROLLED PLOW
Filed May 9, 1940   2 Sheets-Sheet 2
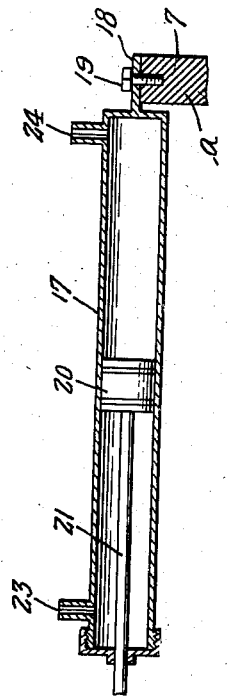
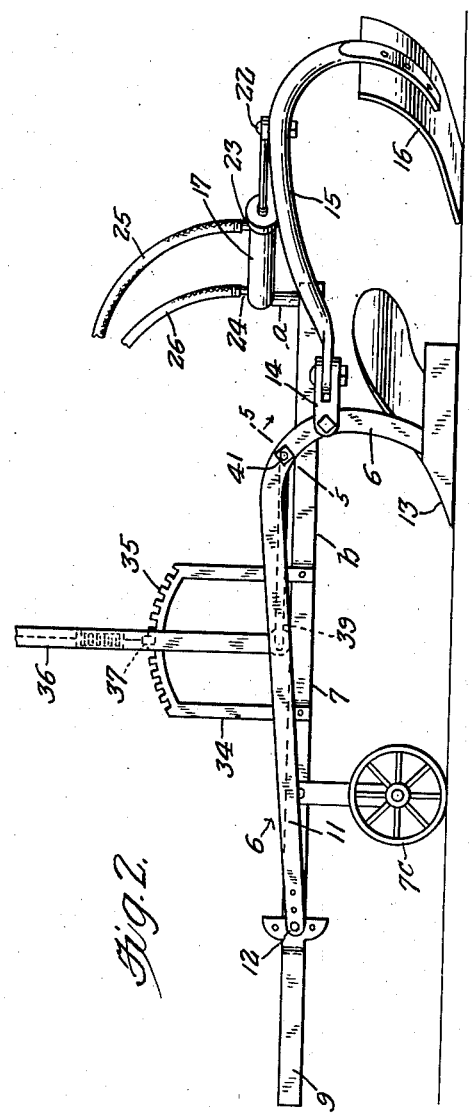
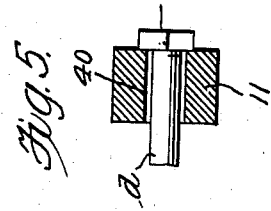
Inventor
*Perle Mason Lund.*
By *Clarence A. O'Brien*
Attorney Patented Aug. 19, 1941

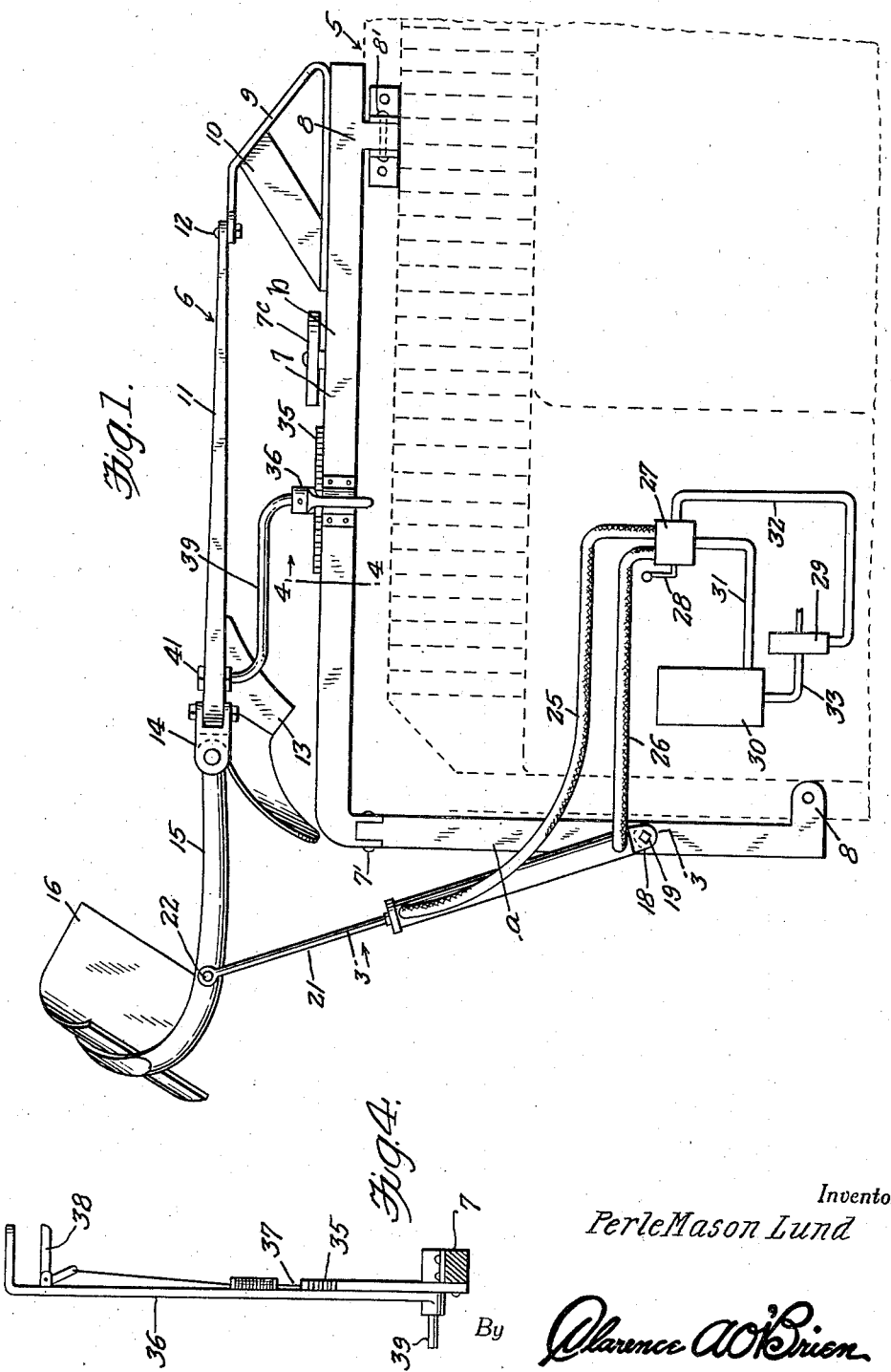

2,253,130

UNITED STATES PATENT OFFICE 2,253,130

HYDRAULICALLY CONTROLLED PLOW

Perle Mason Lund, Woodlake, Calif.

Application May 9, 1940, Serial No. 334,246

4 Claims. (Cl. 97—137)

This invention appertains to new and useful improvements in controls for plows and more particularly to a hydraulic control.

The principal object of the present invention is to provide a cultivator including a plow which can be adjusted horizontally, to the end, that it can be moved in and out between trees in a row, such as when cultivating orchards.

Other objects and advantages of the invention will become apparent to the reader of the following specification.

In the drawings—

Figure 1 represents a top plan view of the apparatus, the tractor being partly shown in broken lines.

Figure 2 is a side elevational view of the cultivator.

Figure 3 is a section on the line 3—3 of Figure 1.

Figure 4 is a sectional view on the line 4—4 of Figure 1.

Figure 5 is a section on the line 5—5 of Figure 2.

Referring to the drawings wherein like numerals designate like parts, it can be seen that numeral 5 generally refers to a tractor, shown in broken lines. The cultivator is generally referred to by numeral 6 and consists of the horizontally disposed L-shaped frame 7 consisting of the rear portion a and the side portion b hinged to the rear portion a as at 7'. An ear 8 is hinged as at 8' to the frame of the tractor 5. A carrier wheel 7c is provided for the hinged side portion b.

A substantially V-shaped bracket 9 having the diagonal brace 10 is attached to the forward portion of the side of the frame 7 and has one end of the bar 11 pivotally connected thereto as at 12. This bar 11 is provided with the downwardly curved forward portion c to which the forward plow 13 is attached.

A universal coupling 14 is provided between the curved portion c of the bar 11 and the forward end of the elongated curved bar 15 of the rear plow or shovel 16. A hydraulic cylinder 17 having an apertured ear 18 at one end, is secured by this ear and a bolt 19 to the rear portion a of the frame 7.

A piston 20 is operative in the cylinder 17 and a connecting rod 21 extends from this piston and is pivotally connected at its outer end as at 22, to the arm 15 of the rear plow 16.

Nipples 23 and 24 project from opposite end portions of the cylinder 17 and to these connect the fluid pressure tubes 25 and 26, respectively. These tubes extend to the control valve 27 which has a control lever 28.

The compressing circuit consists of the pump or compressor 29, the storage tank 30 and the pipes 31, 32 and 33 which extend from the tank 30 to the valve 27, from the valve 27 to the pump 29 and from the pump 29 to the tank 30.

Thus it can be seen that by operating the lever 28, the piston and connecting rod 21 can be moved outwardly or inwardly and accordingly the rear plow 16 will be adjusted laterally to the desired extent.

To permit raising and lowering of the plows, a frame structure 34 supporting the rack 35 is used in conjunction with a hand lever 36 having a detent 37. This detent is controlled by the hand lever 38 and is operative against the teeth of the rack 35. A substantially S-shaped arm 39 extends from the lower end of the hand lever 36 and has the end portion d extending through an opening 40 in the bar 11. The outer end of the arm 39 is threaded to accommodate the nut 41.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A cultivator comprising a frame, a forward plow on the frame, a rearward plow on the frame, and hydraulic means for laterally adjusting the rearwardly disposed plow, said forward plow being provided with a plow beam, said rearward plow being provided with a plow beam and a universal connection between the beams.

2. A cultivator comprising a frame, a pair of interconnected plows at one side of the frame, one plow being located in front of the other and hydraulic control means for the rearmost plow.

3. A cultivator comprising a frame including a side member, an arm on the side member, a plow having a beam, said beam being pivotally connected to the arm, a second plow located rearwardly of the first-mentioned plow and having a beam, said second-mentioned beam being pivotally connected at its forward end to the rear portion of the first-mentioned beam, elevating and lowering means for the first-mentioned beam and hydraulic control means for the second-mentioned beam.

4. A cultivator comprising a frame, a pair of alined plows at one side of the frame, one plow being located in advance of the other, hydraulic control means for the rearmost plow, and a universal connection between the said plows.

PERLE MASON LUND.